(12) United States Patent
Kaneko et al.

(10) Patent No.: US 9,157,132 B2
(45) Date of Patent: *Oct. 13, 2015

(54) HIGH-STRENGTH GALVANIZED STEEL SHEET HAVING EXCELLENT FORMABILITY AND METHOD FOR MANUFACTURING THE SAME

(75) Inventors: Shinjiro Kaneko, Fukuyama (JP); Yoshiyasu Kawasaki, Fukuyama (JP); Tatsuya Nakagaito, Nagoya (JP); Saiji Matsuoka, Kurashiki (JP)

(73) Assignee: JFE Steel Corporation, Tokyo (JP)

( * ) Notice: Subject to any disclaimer, the term of this patent is extended or adjusted under 35 U.S.C. 154(b) by 179 days.

This patent is subject to a terminal disclaimer.

(21) Appl. No.: 13/254,528

(22) PCT Filed: Feb. 19, 2010

(86) PCT No.: PCT/JP2010/053027
§ 371 (c)(1),
(2), (4) Date: Sep. 2, 2011

(87) PCT Pub. No.: WO2010/103936
PCT Pub. Date: Sep. 16, 2010

(65) Prior Publication Data
US 2011/0315279 A1 Dec. 29, 2011

(30) Foreign Application Priority Data
Mar. 10, 2009 (JP) .................. 2009-055857

(51) Int. Cl.
| | | |
|---|---|---|
| *C21D 9/46* | (2006.01) | |
| *C21D 6/00* | (2006.01) | |
| *C21D 8/02* | (2006.01) | |
| *C21D 9/48* | (2006.01) | |
| *C22C 38/02* | (2006.01) | |
| *C22C 38/04* | (2006.01) | |
| *C22C 38/06* | (2006.01) | |
| *C22C 38/34* | (2006.01) | |
| *C22C 38/38* | (2006.01) | |
| *C23C 2/02* | (2006.01) | |
| *C23C 2/06* | (2006.01) | |
| *C23C 2/28* | (2006.01) | |
| *B32B 15/01* | (2006.01) | |
| *C22C 38/00* | (2006.01) | |

(52) U.S. Cl.
CPC ................ *C21D 9/46* (2013.01); *B32B 15/013* (2013.01); *C21D 6/005* (2013.01); *C21D 8/0205* (2013.01); *C21D 9/48* (2013.01); *C22C 38/001* (2013.01); *C22C 38/002* (2013.01); *C22C 38/02* (2013.01); *C22C 38/04* (2013.01); *C22C 38/06* (2013.01); *C22C 38/34* (2013.01); *C22C 38/38* (2013.01); *C23C 2/02* (2013.01); *C23C 2/06* (2013.01); *C23C 2/28* (2013.01); *C21D 2211/005* (2013.01); *C21D 2211/008* (2013.01)

(58) Field of Classification Search
CPC ............ C21D 6/005; C21D 9/46; C21D 9/48; C21D 2211/005; C21D 2211/008; C21D 8/0205; C22C 38/002; C22C 38/02; C22C 38/04; C22C 38/06; C22C 38/34; C22C 38/38; C22C 38/001; C23C 2/02; C23C 2/06; C23C 2/28; B32B 15/013
USPC ................. 148/320, 533, 333–337, 652, 330; 428/659
See application file for complete search history.

(56) References Cited

U.S. PATENT DOCUMENTS

| | | | |
|---|---|---|---|
| 6,743,307 B1 * | 6/2004 | Engl et al. ..................... | 148/333 |
| 7,090,731 B2 * | 8/2006 | Kashima et al. .............. | 148/320 |
| 7,767,036 B2 * | 8/2010 | Kashima et al. .............. | 148/320 |
| 8,815,026 B2 * | 8/2014 | Kaneko et al. ................. | 148/330 |
| 2003/0063996 A1 * | 4/2003 | Funakawa et al. ............ | 420/124 |
| 2004/0238082 A1 * | 12/2004 | Hasegawa et al. ............ | 148/652 |
| 2006/0096678 A1 * | 5/2006 | Kariya ........................... | 148/602 |
| 2007/0190353 A1 * | 8/2007 | Taniguchi et al. ............ | 428/659 |

FOREIGN PATENT DOCUMENTS

| | | | | |
|---|---|---|---|---|
| JP | 2002053935 | 2/2002 | | |
| JP | 2003171735 | 6/2003 | | |
| JP | 2004218025 | 8/2004 | | |
| JP | 2007009269 | * 1/2007 | .............. | C22C 38/00 |
| JP | 2008127637 | 6/2008 | | |
| JP | 2008266778 | 11/2008 | | |

OTHER PUBLICATIONS

International Search Report for PCT/JP2010/053027 dated Apr. 27, 2010.

* cited by examiner

*Primary Examiner* — Roy King
*Assistant Examiner* — Michael Aboagye
(74) *Attorney, Agent, or Firm* — RatnerPrestia

(57) ABSTRACT

The high-strength galvanized steel sheet having excellent formability has a component composition containing, on the basis of mass percent, 0.05 to 0.2% C, 0.5 to 2.5% Si, 1.5 to 3.0% Mn, 0.001 to 0.05% P, 0.0001 to 0.01% S, 0.001 to 0.1% Al, and 0.0005 to 0.01% N, the balance being Fe and incidental impurities; and the steel sheet has a microstructure including a ferritic phase and a martensitic phase including a tempered-martensitic phase, the ferritic phase having an area fraction of 30% or more relative to an entirety of the microstructure, the martensitic phase having an area fraction of 30 to 50% relative to the entirety of the microstructure, and the tempered-martensitic phase having an area fraction of 70% or more relative to an entirety of the martensitic phase.

5 Claims, 1 Drawing Sheet

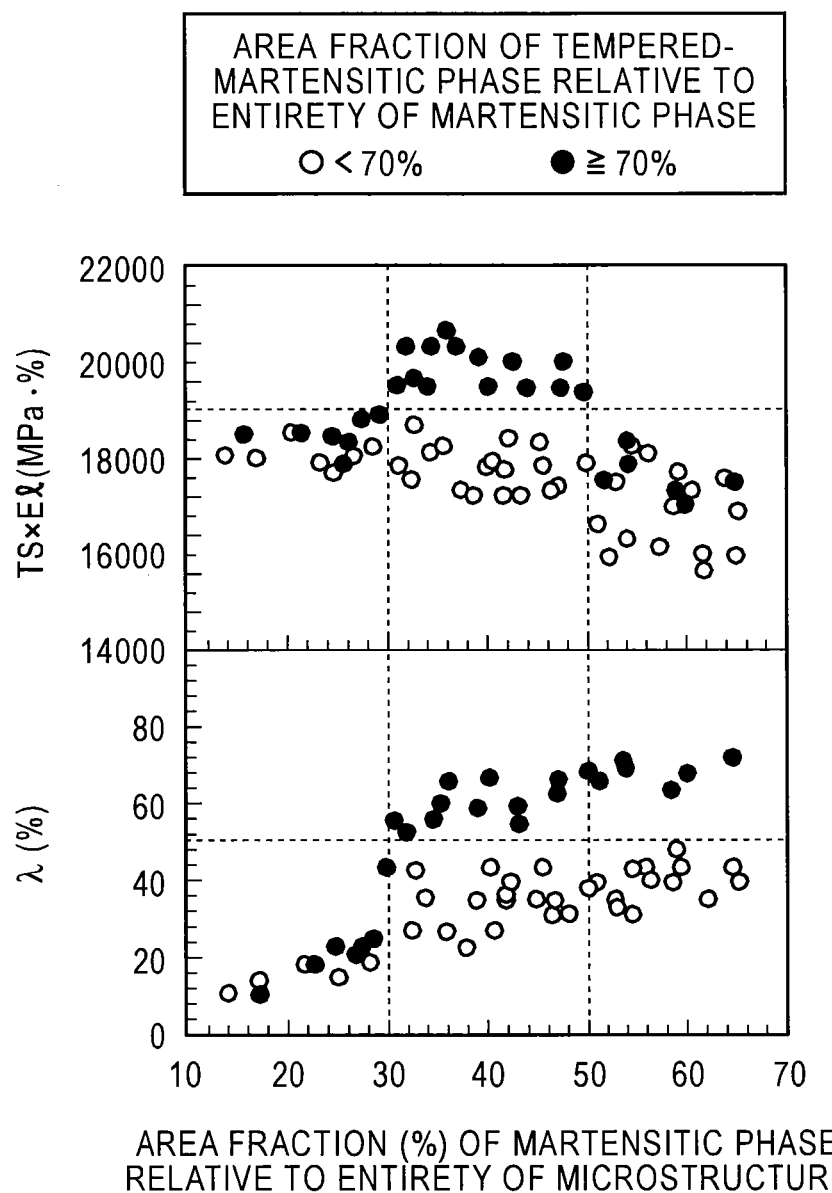

HIGH-STRENGTH GALVANIZED STEEL SHEET HAVING EXCELLENT FORMABILITY AND METHOD FOR MANUFACTURING THE SAME

CROSS-REFERENCE TO RELATED APPLICATIONS

This application is the U.S. National Phase application of PCT International Application No. PCT/JP2010/053027, filed Feb. 19, 2010, and claims priority to Japanese Patent Application No. 2009-055857, filed Mar. 10, 2009, the disclosures of which PCT and priority applications are incorporated herein by reference in their entirely for all purposes.

FIELD OF THE INVENTION

The present invention relates to a high-strength galvanized steel sheet having excellent formability that is mainly suitable as structural members of automobiles; in particular, to a high-strength galvanized steel sheet having excellent formability that has a tensile strength TS of 780 MPa or more and is excellent in terms of ductility, stretch flangeability, and bendability; and a method for manufacturing the high-strength galvanized steel sheet.

BACKGROUND OF THE INVENTION

In recent years, to provide crash safety of automobiles for the occupants and to improve the fuel efficiency of automobiles by decreasing the weight of automobile bodies, the application of high-strength steel sheets having a TS of 780 MPa or more and a small thickness to structural members of automobiles has been promoted. In particular, the application of steel sheets having a very high strength of 980-MPa-grade TS or 1180-MPa-grade TS has also been recently studied.

However, in general, an increase in the strength of steel sheets results in degradation of the ductility, stretch flangeability, and bendability of steel sheets and leads to degradation of the formability of steel sheets. Accordingly, galvanized steel sheets having a high strength, excellent formability, and excellent corrosion resistance are demanded.

To meet such a demand, for example, Patent Literature 1 proposes a high-strength galvannealed steel sheet having excellent formability and excellent adhesion of the coating. This steel sheet contains, on the basis of mass percent, 0.04 to 0.1% C, 0.4 to 2.0% Si, 1.5 to 3.0% Mn, 0.0005 to 0.005% B, 0.1% or less P, more than 4N and 0.05% or less Ti, and 0.1% or less Nb, the balance being Fe and incidental impurities; has galvannealing coatings on the surfaces of the steel sheet, the galvannealing coatings containing 5 to 25% Fe; has a multi-phase microstructure of a ferritic phase and a martensitic phase; and has a TS of 800 MPa or more. Patent Literature 2 proposes a high-strength galvannealed steel sheet having good formability that contains, on the basis of mass percent, 0.05 to 0.15% C, 0.3 to 1.5% Si, 1.5 to 2.8% Mn, 0.03% or less P, 0.02% or less S, 0.005 to 0.5% Al, and 0.0060% or less N, the balance being Fe and incidental impurities; satisfies (Mn %)/(C %)≥15 and (Si %)/(C %)≥4; and has a volume fraction of 3 to 20% in terms of a martensitic phase and a retained austenitic phase in a ferritic phase. Patent Literature 3 proposes a high-strength galvanized steel sheet with low yield ratio that has excellent stretch flangeability. This steel sheet contains, on the basis of mass percent, 0.04 to 0.14% C, 0.4 to 2.2% Si, 1.2 to 2.4% Mn, 0.02% or less P, 0.01% or less S, 0.002 to 0.5% Al, 0.005 to 0.1% Ti, and 0.006% or less N, satisfies (Ti %)/(S %)≥5, the balance being Fe and incidental impurities; has a volume fraction of 6% or more in terms of the total of a martensitic phase and a retained austenitic phase; and satisfies $\alpha \leq 50000 \times \{(Ti\ \%)/48+(Nb\ \%)/93+(Mo\ \%)/96+(V\ \%)/51\}$ where $\alpha\%$ represents the volume fraction of a hard phase microstructure including the martensitic phase, the retained austenitic phase, and a bainitic phase. Patent Literature 4 proposes a high-strength galvanized steel sheet having excellent adhesion of the coating and excellent elongation during forming of the steel sheet. This steel sheet contains, on the basis of mass percent, 0.001 to 0.3% C, 0.01 to 2.5% Si, 0.01 to 3% Mn, and 0.001 to 4% Al, the balance being Fe and incidental impurities; has galvanization coatings on the surfaces of the steel sheet, the galvanization coatings containing, on the basis of mass percent, 0.001 to 0.5% Al and 0.001 to 2% Mn, the balance being Zn and incidental impurities; satisfies $0 \leq 3-(X+Y/10+Z/3)-12.5\times(A-B)$ where, on the basis of mass percent, X represents the content of Si of the steel, Y represents the content of Mn of the steel, Z represents the content of Al of the steel, A represents the content of Al of the galvanization coatings, and B represents the content of Mn of the galvanization coatings; and has a microstructure that is constituted by a primary ferritic phase (volume fraction: 70 to 97%) having an average grain size of 20 μm or less and a secondary phase (volume fraction: 3 to 30%) constituted by a austenitic phase and/or a martensitic phase, the secondary phase having an average grain size of 10 μm or less.

PATENT LITERATURE

[PTL 1]: Japanese Unexamined Patent Application Publication No. 9-13147
[PTL 2]: Japanese Unexamined Patent Application Publication No. 11-279691
[PTL 3]: Japanese Unexamined Patent Application Publication No. 2002-69574
[PTL 4]: Japanese Unexamined Patent Application Publication No. 2003-55751

SUMMARY OF THE INVENTION

It has been discovered that high-strength galvanized steel sheets described in Patent Literatures 1 to 4 are not necessarily excellent in terms of ductility, stretch flangeability, and bendability.

In view of such a circumstance, the present invention provides a high-strength galvanized steel sheet having excellent formability, the steel sheet having a TS of 780 MPa or more and being excellent in terms of ductility, stretch flangeability, and bendability; and a method for manufacturing such a high-strength galvanized steel sheet.

The inventors of the present invention have performed the following studies.

Steel that contained, on the basis of mass percent, 0.103% C, 1.29% Si, 2.41% Mn, 0.011% P, 0.0021% S, 0.029% Al, 0.0031% N, 0.31% Cr, and 0.12% Mo, the balance being Fe and incidental impurities was refined with a vacuum melting furnace on a laboratory scale and formed into slabs. These slabs were heated at 1250° C.; hot-rolled at a finishing temperature of 880° C.; subsequently, after the lapse of 0.5 s, cooled with water at an average cooling rate of 10 to 250° C./s to 550° C. or less; and subjected to a heat treatment equivalent to coiling at a temperature of 500 to 700° C., to thereby provide hot-rolled steel sheets. These hot-rolled steel sheets were pickled to remove scale; then cold-rolled with a reduction ratio of 50%; and subjected to a quasi-galvanizing line: subjected to annealing of heating at 700° C. at an average heating rate of 5° C./s or more, continuously soaking in the temperature range of 700 to 900° C. for 120 s, and cooling to the temperature range of 520° C. or less at an average cooling rate of 10° C./s, and then immersed in a galvanizing bath containing 0.13% Al at 475° C. for 3 s to thereby perform a galvanizing treatment. Thus, galvanization coatings having an amount of 45 g/m² were formed on the surfaces of the steel sheets. The steel sheets were continuously subjected to a treatment of alloying the galvanization coatings at 550° C. and then cooled to room temperature at an average cooling rate of 15° C./s to provide galvanized steel sheets.

The thus-provided galvanized steel sheets were analyzed in terms of microstructure and measured in terms of strength TS, total elongation El, and hole expansion ratio λ by the following methods.

Analysis of microstructure: A section of a steel sheet, the section being taken along the thickness of the sheet and in the direction parallel to the rolling direction of the sheet, was corroded with nital. Ten fields of view of the section were then inspected with a scanning electron microscope (SEM) at a magnification of 1000 to 5000 times to identify a ferritic phase, a martensitic phase, and a tempered-martensitic phase in the martensitic phase. Analysis was performed with an image analysis software (Image-Pro, manufactured by Cybernetics, Inc.) to calculate the area fractions of the ferritic phase and the martensitic phase relative to the entirety of the microstructure. In addition, the area fraction of the tempered-martensitic phase relative to the entirety of the martensitic phase was also calculated. Note that an as-quenched martensitic phase can be distinguished from a tempered-martensitic phase with respect to the structure of the corroded surface. Specifically, a martensitic phase has a smooth surface and a tempered-martensitic phase has a structure (irregularities) generated by corrosion in crystal grains. In this way, each crystal grain is identified whether it has a martensitic phase or a tempered-martensitic phase. The area fractions of these phases and the fraction of the tempered-martensitic phase relative to the entirety of the martensitic phase can be determined by the above-described method.

Measurement in terms of TS and El: To perform evaluation in terms of strength and ductility, JIS No. 5 tensile specimens in the direction perpendicular to the rolling direction were obtained and subjected to a tensile test at a crosshead speed of 20 mm/min in accordance with JIS Z 2241. Thus, TS and El were determined.

Measurement in terms of hole expansion ratio λ: To evaluate stretch flangeability, 100 mm×100 mm specimens were obtained and subjected to the hole expanding test according to JFST 1001 (The Japan Iron and Steel Federation Standard) three times and the average hole expansion ratio λ (%) was calculated.

As a result, as illustrated in FIG. 1, when the area fraction of the tempered-martensitic phase relative to the entirety of the martensitic phase is 70% or more, high TS×El and high λ are achieved in the range where the area fraction of the martensitic phase relative to the entirety of the microstructure is 30 to 50%.

In addition, the following fact has also been revealed.

Excellent ductility, stretch flangeability, and bendability are achieved in the following manner: a steel slab having been made to have an appropriate component composition is hot-rolled; within 2 s after the hot rolling, cooled to 600° C. or less at an average cooling rate of 50° C./s or more; coiled at a specific coiling temperature determined in accordance with the component composition; cold-rolled with a reduction ratio of 40% or more; then annealed by heating at an average heating rate of 5° C./s or more to the temperature range equal to or more than the $Ac_1$ transformation temperature, continuously soaking in the temperature range of (the $Ac_1$ transformation temperature+50° C.) or more and the $Ac_3$ transformation temperature or less for 30 to 500 s, and cooling to the temperature range of 600° C. or less at an average cooling rate of 3 to 30° C./s; and then subjected to a galvanizing treatment.

The present invention has been accomplished on the basis of such findings. The present invention provides a high-strength galvanized steel sheet having excellent formability, the steel sheet according to one embodiment having a component composition containing, on the basis of mass percent, 0.05 to 0.2% C, 0.5 to 2.5% Si, 1.5 to 3.0% Mn, 0.001 to 0.05% P, 0.0001 to 0.01% S, 0.001 to 0.1% Al, and 0.0005 to 0.01% N, the balance being Fe and incidental impurities; and the steel sheet having a microstructure including a ferritic phase and a martensitic phase including a tempered-martensitic phase, the ferritic phase having an area fraction of 30% or more relative to an entirety of the microstructure, the martensitic phase having an area fraction of 30 to 50% relative to the entirety of the microstructure, and the tempered-martensitic phase having an area fraction of 70% or more relative to an entirety of the martensitic phase.

The high-strength galvanized steel sheet according to the present invention preferably further contains, on the basis of mass percent, alone or in combination, 0.01 to 1.5% Cr; at least one of 0.0005 to 0.1% Ti and 0.0003 to 0.003% B; 0.0005 to 0.05% Nb; and at least one selected from 0.01 to 1.0% Mo, 0.01 to 2.0% Ni, and 0.01 to 2.0% Cu.

In the high-strength galvanized steel sheet according to the present invention, a galvanization coating may be a galvannealing coating.

The high-strength galvanized steel sheet according to the present invention can be manufactured by, for example, a method including subjecting a steel slab having the above-described component composition, to heating to a temperature of 1150 to 1300° C.; then to hot rolling at a finishing temperature of 800 to 950° C.; within 2 s after the hot rolling, to cooling to 600° C. or less at an average cooling rate of 50° C./s or more; to coiling at a coiling temperature of less than Tct° C.; to cold rolling with a reduction ratio of 40% or more; then to annealing of heating at an average heating rate of 5° C./s or more to a temperature range equal to or more than an $Ac_1$ transformation temperature, continuously soaking in a temperature range of (the $Ac_1$ transformation temperature+ 50° C.) or more and an $Ac_3$ transformation temperature or less for 30 to 500 s, and cooling to a temperature range of 600° C. or less at an average cooling rate of 3 to 30° C./s; then to a galvanizing treatment; and continuously to cooling at an average cooling rate of 30° C./s or less.

Note that Tct=810−300×[C]−60×[Si]−60×[Mn]−70×[Cr]−80×[Mo]−40×[Ni]−70×[Cu] is satisfied where [M] represents a content of an element M on the basis of mass percent and, when the element M is an incidental impurity, [M] is equal to 0.

In the method for manufacturing a high-strength galvanized steel sheet according to the present invention, after the galvanizing treatment is performed, a treatment of alloying a galvanization coating in a temperature range of 450 to 600° C. may be performed.

According to the present invention, a high-strength galvanized steel sheet having excellent formability that has a TS of 780 MPa or more and is excellent in terms of ductility, stretch flangeability, and bendability can be manufactured. Application of high-strength galvanized steel sheets according to the present invention to structural members of automobiles enhances safety for occupants and improves fuel efficiency by a considerable decrease in the weight of automobile bodies.

BRIEF DESCRIPTION OF THE DRAWING

FIG. 1 is a graph illustrating the relationship between the area fraction of a martensitic phase relative to the entirety of a microstructure and TS×El and X while the area fraction of a tempered-martensitic phase relative to the entirety of the martensitic phase is changed.

DETAILED DESCRIPTION OF THE INVENTION

Hereinafter, exemplary embodiments of the present invention will be described in detail. Note that "%" in the representation of the content of component elements means "mass percent" unless otherwise specified.

1) Component Composition

C: 0.05 to 0.2%

C is an important element in hardening of steel and has a high capability of achieving solution hardening. C is also an indispensable element for adjusting the area fraction or hardness of a martensitic phase in hardening of a microstructure by using the martensitic phase. When the content of C is less than 0.05%, it is difficult to achieve a necessary area fraction of a martensitic phase and the martensitic phase does not harden and hence a sufficiently high strength is not achieved. When the content of C is more than 0.2%, weldability is degraded and a segregation layer is formed and, as a result, formability is degraded. Therefore, the content of C is made 0.05 to 0.2%.

Si: 0.5 to 2.5%

During the cooling performed in the annealing, Si promotes ferrite transformation and transfers solute C from a ferritic phase to an austenitic phase to clean the ferritic phase and enhance elongation and to stabilize the austenitic phase. Accordingly, even in a galvanizing line in which it is difficult to perform rapid cooling, a martensitic phase is generated and the formation of a multi-phase microstructure is facilitated. In particular, since the austenitic phase is stabilized during the cooling, generation of a pearlitic phase and a bainitic phase is suppressed and generation of the martensitic phase is promoted. In addition, Si dissolved in the ferritic phase promotes work hardening to enhance elongation and improves strain propagation in regions where strain is concentrated to enhance bendability. Furthermore, Si allows solution hardening of the ferritic phase so that the difference in hardness between the ferritic phase and the martensitic phase is reduced, generation of cracks at the interface between these phases is suppressed, and the capability of local deformation is improved to thereby enhance stretch flangeability and bendability. To achieve such advantages, the content of Si is preferably 0.5% or more. When the content of Si is more than 2.5%, the transformation temperature considerably increases and manufacturing stability is degraded; in addition, an abnormal structure develops and formability is degraded. Therefore, the content of Si is made 0.5 to 2.5%.

Mn: 1.5 to 3.0%

Mn is advantageous in that hot shortness of steel is suppressed and a certain level of strength is achieved. In addition, Mn enhances hardenability to facilitate the formation of a multi-phase microstructure. Furthermore, Mn increases the fraction of the secondary phase in the annealing, reduces the content of C in an untransformed austenitic phase, increases the occurrence of self-tempering in the cooling performed after the galvanizing treatment, and reduces the hardness of a martensitic phase in the final product to suppress local deformation to thereby enhance stretch flangeability and bendability. Mn also has the effect of suppressing generation of a pearlitic phase and a bainitic phase in cooling, facilitates the transformation from the austenitic phase to the martensitic phase and hence the martensitic phase to be self-tempered can be generated so as to have a sufficiently large fraction. To achieve such advantages, the content of Mn is preferably 1.5% or more. When the content of Mn is more than 3.0%, formability is degraded. Therefore, the content of Mn is made 1.5 to 3.0%.

P: 0.001 to 0.05%

P is an element that has the effect of solution hardening and can be added in accordance with a desired strength. In addition, P promotes ferrite transformation and hence is advantageous for the formation of a multi-phase microstructure. To achieve such advantages, the content of P is preferably 0.001% or more. When the content of P is more than 0.05%, weldability is degraded; and, when a treatment of alloying a galvanization coating is performed, the alloying rate decreases and the quality of the galvanization coating is degraded. Therefore, the content of P is made 0.001 to 0.05%.

S: 0.0001 to 0.01%

S segregates in grain boundaries to embrittle steel in hot working. In addition, S is present as a sulfide to degrade the capability of local deformation. Accordingly, the content of S is made 0.01% or less, preferably 0.003% or less, more preferably 0.001% or less. However, because of constraints of the manufacturing technique, the content of S is preferably 0.0001% or more. Therefore, the content of S is made 0.0001 to 0.01%, preferably 0.0001 to 0.003%, more preferably 0.0001 to 0.001%.

Al: 0.001 to 0.1%

Al is an element that is effective to generate a ferritic phase and enhance the balance between the strength and the elongation. To achieve such advantages, the content of Al is preferably 0.001% or more. When the content of Al is more than 0.1%, surface quality is degraded. Therefore, the content of Al is made 0.001 to 0.1%.

N: 0.0005 to 0.01%

N is an element that degrades the aging resistance of steel. In particular, when the content of N is more than 0.01%, the aging resistance is considerably degraded. The lower the content of N is, the more it is preferred. However, because of constraints of the manufacturing technique, the content of N is preferably 0.0005% or more. Therefore, the content of N is made 0.0005 to 0.01%.

The balance is Fe and incidental impurities. For the following reasons, 0.01 to 1.5% Cr; at least one of 0.0005 to 0.1% Ti and 0.0003 to 0.003% B; 0.0005 to 0.05% Nb; and at least one selected from 0.01 to 1.0% Mo, 0.01 to 2.0% Ni, and 0.01 to 2.0% Cu are preferably contained alone or in combination.

Cr: 0.01 to 1.5%

Cr increases the fraction of the secondary phase in the annealing and reduces the content of C in an untransformed austenitic phase to thereby increase the occurrence of self-tempering in the cooling performed after the galvanizing treatment, reduce the hardness of a martensitic phase in the final product, suppress local deformation, and enhance stretch flangeability and bendability. Cr also dissolves in a carbide to facilitate generation of the carbide and allows self-tempering to proceed in a very short period. Cr also suppresses generation of a pearlitic phase and a bainitic phase in cooling, facilitates the transformation from the austenitic phase to the martensitic phase and hence the martensitic phase to be self-tempered can be generated so as to have a sufficiently large fraction. To achieve such advantages, the content of Cr is preferably 0.01% or more. When the content of Cr is more than 1.5%, for example, the fraction of the secondary phase becomes too large or a Cr carbide is excessively generated and, as a result, the elongation is degraded. Therefore, the content of Cr is made 0.01 to 1.5%.

Ti: 0.0005 to 0.1%

Ti forms precipitate with C, S, and N to effectively enhance the strength and the toughness. In addition, when B is added, N is precipitated as TiN to suppress precipitation of BN to thereby effectively provide the effect of B described below. To achieve such advantages, the content of Ti is preferably 0.0005% or more. When the content of Ti is more than 0.1%, the precipitation strengthening is excessively exhibited and the elongation is degraded. Therefore, the content of Ti is made 0.0005 to 0.1%.

B: 0.0003 to 0.003%

B has the effect of suppressing generation of a pearlitic phase and a bainitic phase from an austenitic phase and enhancing the stability of the austenitic phase. Thus, B facilitates martensite transformation and the subsequent self-tempering in the cooling performed after the galvanizing treatment. To achieve such advantages, the content of B is preferably 0.0003% or more. When the content of B is more than 0.003%, the elongation is degraded. Therefore, the content of B is made 0.0003 to 0.003%.

Nb: 0.0005 to 0.05%

Nb has the effect of enhancing the strength of a steel sheet and can be optionally added to achieve a desired strength. By adding Nb in an appropriate amount, an austenitic phase generated by reverse transformation in the annealing in a galvanizing line is made fine in size and hence the microstructure after the annealing is also made fine in size and the strength is enhanced. In addition, fine precipitate is formed during the hot rolling or in the annealing in a galvanizing line to enhance the strength. To achieve such advantages, the content of Nb added is preferably 0.0005% or more. When the content of Nb is made more than 0.05%, the microstructure is made excessively fine and an appropriate microstructure described below cannot be provided. Therefore, the content of Nb is made 0.0005 to 0.05%.

At least one of 0.01 to 1.0% Mo, 0.01 to 2.0% Ni, and 0.01 to 2.0% Cu

Mo, Ni, and Cu not only play the role of elements providing solution hardening but also stabilize the austenitic phase and facilitates the formation of a multi-phase microstructure during the cooling performed in the annealing. To achieve such advantages, the content of Mo, the content of Ni, or the content of Cu is preferably 0.01% or more. When the content of Mo is more than 1.0%, the content of Ni is more than 2.0%, or the content of Cu is more than 2.0%, wettability, formability, and spot weldability are degraded. Therefore, the content of Mo is made 0.01 to 1.0%, the content of Ni is made 0.01 to 2.0%, and the content of Cu is made 0.01 to 2.0%.

2) Microstructure

Area fraction of ferritic phase relative to entirety of microstructure: 30% or more A high-strength galvanized steel sheet according to the present invention has a multi-phase microstructure in which a martensitic phase that is hard is mainly dispersed in a ferritic phase that has excellent elongation and is soft. To achieve a sufficiently high elongation, the area fraction of the ferritic phase relative to the entirety of the microstructure is preferably 30% or more.

Area fraction of martensitic phase relative to entirety of microstructure: 30 to 50%

To achieve a TS of 780 MPa or more, the area fraction of the martensitic phase including a tempered-martensitic phase, relative to the entirety of the microstructure is preferably 30% or more. However, when the area fraction of the martensitic phase is more than 50%, a sufficiently high elongation is not achieved. Therefore, the area fraction of the martensitic phase relative to the entirety of the microstructure is made 30 to 50%.

Area fraction of tempered-martensitic phase relative to entirety of martensitic phase: 70% or more The tempered-martensitic phase is softer than the as-quenched martensitic phase and reduces the difference in hardness between the ferritic phase and the martensitic phase to enhance the capability of local deformation and enhance stretch flangeability and bendability. In particular, in the case of the above-described area fractions of the ferritic phase and the martensitic phase, the capability of uniform deformation and the capability of local deformation are appropriately balanced and hence stretch flangeability and bendability can be enhanced without degrading elongation. To sufficiently achieve such an advantage, the area fraction of the tempered-martensitic phase relative to the entirety of the martensitic phase is preferably 70% or more.

Herein, the area fractions of the ferritic phase and the martensitic phase relative to the entirety of the microstructure and the area fraction of the tempered-martensitic phase relative to the entirety of the martensitic phase are determined by the above-described methods.

The as-quenched martensitic phase is a microstructure that has the same chemical composition as an untransformed austenitic phase; is supersaturated with C dissolved therein; has a body-centered cubic structure; includes microscopic structures such as lath, packet, and block; has a high dislocation density; and is a hard phase. The tempered-martensitic phase is a ferritic phase in which C with which the martensitic phase has been supersaturated precipitates as a carbide and the microscopic structures of the parent phase are maintained, the ferritic phase having a high dislocation density. In addition, it is not particularly necessary to classify tempered-martensitic phases in terms of thermal history of providing the tempered-martensitic phases, such as "quenching and tempering" or "self-tempering".

Note that the advantages of the present invention are not degraded even when a microstructure according to the present invention contains, in addition to a ferritic phase and a martensitic phase, a retained austenitic phase, a pearlitic phase, and a bainitic phase such that the total area fraction of the retained austenitic phase, the pearlitic phase, and the bainitic phase relative to the entirety of the microstructure is 20% or less.

3) Manufacturing Conditions

As described above, a high-strength galvanized steel sheet according to the present invention can be manufactured by, for example, a method including subjecting a steel slab having the above-described component composition to heating to a temperature of 1150 to 1300° C.; then to hot rolling at a finishing temperature of 800 to 950° C.; within 2 s after the hot rolling, to cooling to 600° C. or less at an average cooling rate of 50° C./s or more; to coiling at a coiling temperature of less than Tct° C.; to cold rolling with a reduction ratio of 40% or more; then to annealing of heating at an average heating rate of 5° C./s or more to a temperature range equal to or more than an $Ac_1$ transformation temperature, continuously soaking in a temperature range of (the $Ac_1$ transformation temperature+50° C.) or more and an $Ac_3$ transformation temperature or less for 30 to 500 s, and cooling to a temperature range of 600° C. or less at an average cooling rate of 3 to 30° C./s; then to a galvanizing treatment; and continuously to cooling at an average cooling rate of 30° C./s or less.

Heating temperature of slab: 1150 to 1300° C.

In view of achieving a sufficiently high temperature in the hot rolling, the heating temperature of the slab is preferably 1150° C. or more. When the heating temperature is too high, oxidation weight increases and, as a result, problems such as an increase in scale loss are caused. Thus, the upper limit of the heating temperature of the slab is made 1300° C.

To suppress macrosegregation, the slab is preferably manufactured by a continuous casting method. Alternatively, the slab may be manufactured by an ingot-making method or the like.

Finishing temperature in hot rolling: 800 to 950° C.

The heated slab is hot-rolled by rough rolling and finish rolling to be turned into a hot-rolled steel sheet. At this time, when the finishing temperature is too high, grains become coarse, the formability of the final product is degraded, and scale defects tend to be generated. Accordingly, the finishing temperature is made 950° C. or less. When the finishing temperature is less than 800° C., a rolling force increases and a rolling load becomes high; and a reduction ratio becomes high in a state in which an austenitic phase is not recrystallized and an abnormal aggregation texture develops, which is not preferable in view of material uniformity in the final product. Therefore, the finishing temperature is made 800 to 950° C., preferably 840 to 920° C.

The slab is turned into a sheet bar by rough rolling under standard conditions. When the heating temperature is made relatively low, in view of preventing problems in the hot rolling, the sheet bar is preferably heated with a bar heater or the like prior to finish rolling.

In the present invention, the hot-rolled steel sheet is preferably made to have a microstructure including, as primary phases, a ferritic phase and a bainitic phase. A bainitic phase and a ferritic phase that is generated at a relatively low temperature contain a large number of dislocations and serve as starting points of austenite reverse transformation, and hence a martensitic phase can be contained in the final product so as to have a predetermined fraction.

Cooling conditions after hot rolling: within 2 s, cooling to 600° C. or less at average cooling rate of 50° C./s or more When more than 2 seconds have elapsed after the hot rolling and before cooling is initiated, a ferritic phase tends to be non-uniformly generated on a run-out table and a preferred microstructure of a hot-rolled steel sheet according to the present invention that uniformly includes, as primary phases, a ferritic phase and a bainitic phase is not obtained. The same problem is also caused when the average cooling rate is less than 50° C./s or cooling to 600° C. or less is not performed.

Coiling temperature after hot rolling: less than Tct° C.

The Tct° C. is defined above with the experimental equation of the coiling temperature empirically obtained by the inventors of the present invention. When the coiling temperature is made less than Tct° C., the hot-rolled steel sheet can be made to have a preferred microstructure according to exemplary embodiments of the present invention that includes, as primary phases, a ferritic phase and a bainitic phase.

Reduction ratio in cold rolling: 40% or more

When the reduction ratio is less than 40%, the total number of grain boundaries and dislocations per unit volume that serve as the cores of reverse transformation into an austenitic phase in the subsequent annealing decreases and it becomes difficult to obtain the above-described microstructure in the final product. In addition, the microstructure becomes non-uniform and ductility, stretch flangeability, and bendability are degraded.

Heating conditions in annealing: heating at average heating rate of 5° C./s or more to temperature range equal to or more than $Ac_1$ transformation temperature By performing heating at an average heating rate of 5° C./s or more to a temperature range equal to or more than the $Ac_1$ transformation temperature, recovery and recrystallization of a ferritic phase during the heating are suppressed, and reverse transformation occurs in a state in which a large number of dislocations are present in the subsequent soaking and hence an austenitic phase is uniformly dispersed at a high density. Thus, stretch flangeability and bendability in the final product can be enhanced.

Soaking conditions in annealing: soaking in a temperature range of ($Ac_1$ transformation temperature+50° C.) or more and $Ac_3$ transformation temperature or less for 30 to 500 s By increasing the fraction of an austenitic phase in soaking, the concentration of C in the austenitic phase decreases and the Ms point increases. Thus, the effect of self-tempering in the cooling performed after the galvanizing treatment can be exhibited. In addition, since the fraction of the martensitic phase in the final product increases, even when the hardness of the martensitic phase decreases due to tempering, a sufficiently high strength can still be achieved. Thus, a sufficiently high strength and a good local elongation can be achieved. Accordingly, the soaking treatment is preferably performed in the temperature range of (the $Ac_1$ transformation temperature+50° C.) or more and the $Ac_3$ transformation temperature or less. When the soaking temperature is less than the (the $Ac_1$ transformation temperature+50° C.), the fraction of the austenitic phase becomes insufficient and the effect of self-tempering cannot be exhibited and, as a result, degradation of stretch flangeability, bendability, and strength is caused. When the soaking temperature is more than the $Ac_3$ transformation temperature, the ferritic phase is not sufficiently generated and elongation is degraded.

When the soaking time is less than 30 s, reverse transformation into the austenitic phase does not sufficiently occur and the necessary fraction of the austenitic phase cannot be achieved. When the soaking time is more than 500 s, the effect of soaking becomes saturated and the productivity decreases.

Cooling conditions in annealing: cooling to temperature range of 600° C. or less at average cooling rate of 3 to 30° C./s After the soaking, cooling is preferably performed from the soaking temperature to the temperature range of 600° C. or less (cooling termination temperature) at an average cooling rate of 3 to 30° C./s. When the average cooling rate is less than 3° C./s, ferrite transformation proceeds in the cooling, the concentration of C in an untransformed austenitic phase increases, and the effect of self-tempering cannot be exhibited. Thus, degradation of stretch flangeability or bendability is caused. When the average cooling rate is more than 30° C./s, the effect of suppressing the ferrite transformation becomes saturated; and it is also difficult to achieve this with equipment. When the cooling termination temperature is more than 600° C., generation of the ferritic phase and a pearlitic phase results in a considerable decrease in the fraction of the martensitic phase and the area fraction of the martensitic phase relative to the entirety of the microstructure becomes less than 30% and hence a TS of 780 MPa or more cannot be achieved.

Galvanizing treatment: standard conditions

After the annealing, galvanization is performed under standard conditions. After the galvanization, a treatment of alloying the galvanization coating in the temperature range of 450 to 600° C. may be performed. By alloying the coating in the temperature range of 450 to 600° C., the concentration of Fe in the coating becomes 8 to 12% and adhesion of the coating and corrosion resistance of the coating after being painted are enhanced. When the temperature is less than 450° C., alloying does not sufficiently proceed and the effect of sacrificial protection is degraded and slidability is degraded. When the temperature is more than 600° C., alloying excessively proceeds and powdering properties are degraded, or a large amount of a pearlitic phase or a bainitic phase is generated and the strength becomes insufficient or stretch flangeability is degraded.

Cooling conditions after galvanizing treatment: cooling at average cooling rate of 30° C./s or less The self-tempering of a martensitic phase proceeds in the cooling performed after the galvanizing treatment. When the average cooling rate is more than 30° C./s, the self-tempering does not sufficiently proceed and hence stretch flangeability or bendability is degraded.

Other conditions in the manufacturing method are not particularly limited. In view of productivity, the series of treatments such as the annealing, the galvanizing, and the alloying of a galvanization coating is preferably performed with a continuous galvanizing line. The galvanizing is preferably performed with a galvanizing bath containing 0.10 to 0.20% Al. After the galvanizing, to adjust the weight of the coating, wiping may be performed.

EXAMPLES

Steels No. A to I having component compositions described in Table 1 were refined with a steel converter and formed into slabs by a continuous casting method. These slabs were heated at 1250° C.; turned into hot-rolled steel sheets under hot-rolling conditions described in Table 2; then pickled; cold-rolled under cold-rolling conditions described in Table 2; with a continuous galvanizing line, annealed under annealing conditions described in Table 2, then immersed in a galvanizing bath containing 0.13% Al at 475° C. for 3 s to form a galvanization coating having a coating amount of 45 g/m², alloyed at temperatures described in Table 2; and cooled at average cooling rates described in Table 2. Thus, galvanized steel sheets No. 1 to 23 were manufactured. Note that, as described in Table 2, some galvanized steel sheets were not alloyed. The thus-obtained galvanized steel sheets were measured in terms of the area fractions of the ferritic phase and the martensitic phase relative to the entirety of the microstructure and the area fraction of the tempered-martensitic phase relative to the entirety of the martensitic phase by the above-described methods. In addition, TS, El, and λ were measured by the above-described methods. Note that the measurement of λ was performed in terms of the case where an initial hole was formed by a standard blanking process and the case where an initial hole was formed by a reaming process for evaluation of local elongation of the material itself. In addition, strap-shaped specimens having a width of 30 mm and a length of 120 mm in the direction perpendicular to the rolling direction were obtained. The ends of the specimens were made smooth so as to have a surface roughness Ry of 1.6 to 6.3 S. The specimens were then subjected to a bending test at a bending angle of 90° by the V-block method to thereby determine a critical bend radius R that is the minimum bend radius in which cracking or necking is not caused. The specimens were evaluated in terms of bendability with a ratio (R/t) of the critical bend radius R to a sheet thickness T.

The results are described in Table 3. Since all the galvanized steel sheets of the examples of the present invention have a TS of 780 MPa or more and satisfy TS×El≥19000 MPa·%, these galvanized steel sheets are highly balanced between strength and elongation, specifically, are excellent in terms of elongation. In addition, since these galvanized steel sheets have a λ of 50% or more in terms of the blanking process, a λ of 70% or more in terms of the reaming process, and an R/t of 1.0 or less, these galvanized steel sheets are also excellent in terms of stretch flangeability and bendability. Therefore, these galvanized steel sheets are high-strength galvanized steel sheets having excellent formability.

TABLE 1

| Steel No. | C | Si | Mn | P | S | Al | N | Cr | Ti | B | Nb | Ni | Cu | Mo | Ac1 transformation temperature (° C.) | Ac3 transformation temperature (° C.) | Tct (° C.) |
|---|---|---|---|---|---|---|---|---|---|---|---|---|---|---|---|---|---|
| A | 0.102 | 1.24 | 2.00 | 0.020 | 0.0019 | 0.036 | 0.0026 | — | — | — | — | — | — | — | 661 | 846 | 585 |
| B | 0.085 | 1.46 | 2.23 | 0.027 | 0.0021 | 0.029 | 0.0023 | 0.35 | — | — | — | — | — | — | 672 | 859 | 539 |
| C | 0.111 | 1.05 | 2.46 | 0.024 | 0.0018 | 0.029 | 0.0024 | — | 0.025 | 0.0011 | — | — | — | — | 652 | 827 | 566 |
| D | 0.079 | 1.69 | 2.41 | 0.018 | 0.0013 | 0.031 | 0.0027 | 0.81 | — | — | — | 0.12 | 0.23 | 0.11 | 679 | 866 | 454 |
| E | 0.064 | 1.56 | 2.95 | 0.026 | 0.0023 | 0.018 | 0.0037 | — | 0.045 | — | 0.016 | — | — | — | 663 | 865 | 520 |
| F | 0.320 | 1.28 | 1.65 | 0.015 | 0.0026 | 0.030 | 0.0029 | — | — | — | — | — | — | — | 661 | 750 | 538 |
| G | 0.142 | 2.80 | 2.14 | 0.022 | 0.0028 | 0.033 | 0.0025 | 0.36 | — | — | — | — | — | 0.21 | 699 | 917 | 429 |
| H | 0.091 | 0.26 | 2.71 | 0.020 | 0.0015 | 0.027 | 0.0037 | — | 0.019 | 0.0015 | 0.053 | — | — | — | 648 | 787 | 605 |
| I | 0.081 | 1.13 | 3.42 | 0.027 | 0.0009 | 0.031 | 0.0021 | — | — | — | — | — | — | — | 644 | 821 | 513 |

TABLE 2

| | | Hot-rolling conditions | | | | | Cold-rolling conditions | |
|---|---|---|---|---|---|---|---|---|
| Galvanized steel sheet No. | Steel No. | Finishing temperature (° C.) | Cooling initiation timing (s) | Average cooling rate (° C./s) | Cooling termination temperature (° C.) | Coiling temperature (° C.) | Reduction ratio (%) | Sheet thickness (mm) |
| 1 | A | 880 | 0.8 | 200 | 550 | 550 | 50 | 1.6 |
| 2 | | 880 | 0.8 | 15 | 550 | 550 | 50 | 1.6 |
| 3 | | 880 | 0.8 | 200 | 550 | 650 | 50 | 1.6 |
| 4 | | 880 | 0.8 | 200 | 550 | 550 | 50 | 1.6 |
| 5 | | 880 | 0.8 | 200 | 550 | 550 | 50 | 1.6 |

TABLE 2-continued

| | | | | | | | |
|---|---|---|---|---|---|---|---|
| 6 | | 880 | 0.8 | 200 | 550 | 550 | 50 | 1.6 |
| 7 | | 880 | 0.8 | 200 | 550 | 550 | 50 | 1.6 |
| 8 | | 880 | 0.8 | 200 | 550 | 550 | 50 | 1.6 |
| 9 | B | 890 | 0.6 | 230 | 550 | 500 | 60 | 1.2 |
| 10 | | 890 | _5.0_ | 230 | 550 | 500 | 60 | 1.2 |
| 11 | | 890 | 0.6 | 230 | _680_ | 500 | 60 | 1.2 |
| 12 | | 890 | 0.6 | 230 | 550 | 500 | _30_ | 1.2 |
| 13 | | 890 | 0.6 | 230 | 550 | 500 | 60 | 1.2 |
| 14 | | 890 | 0.6 | 230 | 550 | 500 | 60 | 1.2 |
| 15 | | 890 | 0.6 | 230 | 550 | 500 | 60 | 1.2 |
| 16 | | 890 | 0.6 | 230 | 550 | 500 | 60 | 1.2 |
| 17 | C | 880 | 0.8 | 200 | 550 | 500 | 50 | 1.6 |
| 18 | D | 870 | 1.2 | 160 | 550 | 450 | 40 | 2.0 |
| 19 | E | 890 | 0.6 | 230 | 550 | 500 | 60 | 1.2 |
| 20 | _F_ | 890 | 0.6 | 230 | 550 | 500 | 60 | 1.2 |
| 21 | _G_ | 880 | 0.8 | 200 | 550 | 400 | 50 | 1.6 |
| 22 | _H_ | 880 | 0.8 | 200 | 550 | 550 | 50 | 1.6 |
| 23 | I | 890 | 0.6 | 230 | 550 | 500 | 60 | 1.2 |

| | | Annealing conditions | | | | | | Average cooling rate |
|---|---|---|---|---|---|---|---|---|
| | | Heating | | Soaking | | Cooling | Alloying | (° C./s) |
| Galvanized steel sheet No. | Steel No. | Average rate (° C./s) | Temperature (° C.) | Temperature (° C.) | Time (s) | Average rate (° C./s) | Termination temperature (° C.) | temperature (° C.) | after galvanizing treatment |
| 1 | A | 12 | 730 | 820 | 110 | 10 | 525 | 550 | 10 |
| 2 | | 12 | 730 | 820 | 110 | 10 | 525 | 550 | 10 |
| 3 | | 12 | 730 | 820 | 110 | 10 | 525 | 550 | 10 |
| 4 | | _3_ | 730 | 820 | 110 | 10 | 525 | 550 | 10 |
| 5 | | 12 | 680 | _700_ | 110 | 10 | 525 | 550 | 10 |
| 6 | | 12 | 730 | 820 | _10_ | 10 | 525 | 550 | 10 |
| 7 | | 12 | 730 | 820 | 110 | _2_ | 525 | 550 | 10 |
| 8 | | 12 | 730 | 820 | 110 | 10 | 525 | 550 | _50_ |
| 9 | B | 15 | 750 | 825 | 90 | 12 | 525 | 550 | 8 |
| 10 | | 15 | 750 | 825 | 90 | 12 | 525 | 550 | 8 |
| 11 | | 15 | 750 | 825 | 90 | 12 | 525 | 550 | 8 |
| 12 | | 15 | 750 | 825 | 90 | 12 | 525 | 550 | 8 |
| 13 | | 15 | _650_ | 825 | 90 | 12 | 525 | 550 | 8 |
| 14 | | 15 | 750 | _880_ | 90 | 12 | 525 | 550 | 8 |
| 15 | | 15 | 750 | 825 | 90 | 12 | _625_ | 550 | 8 |
| 16 | | 15 | 750 | 825 | 90 | 12 | 525 | _625_ | 8 |
| 17 | C | 12 | 720 | 800 | 110 | 10 | 525 | 550 | 10 |
| 18 | D | 10 | 750 | 800 | 140 | 8 | 525 | — | 6 |
| 19 | E | 15 | 730 | 825 | 90 | 12 | 525 | 550 | 8 |
| 20 | _F_ | 15 | 730 | 740 | 90 | 12 | 525 | 550 | 10 |
| 21 | _G_ | 12 | 770 | 900 | 110 | 10 | 525 | 550 | 10 |
| 22 | _H_ | 12 | 720 | 780 | 110 | 10 | 525 | — | 8 |
| 23 | I | 15 | 720 | 800 | 90 | 12 | 525 | 550 | 8 |

TABLE 3

| | Microstructure* | | | Mechanical test values | | | | | | |
|---|---|---|---|---|---|---|---|---|---|---|
| Galvanized steel sheet No. | Area fraction (%) of α-phase relative to entirety of microstructure | Area fraction (%) of M-phase relative to entirety of microstructure | Area fraction (%) of tempered M-phase relative to entirety of M-phase | TS (MPa) | El (%) | TS × El (MPa · %) | λ (blanking process) (%) | λ (reaming process) (%) | R/t | Remarks |
| 1 | 65 | 35 | 92 | 1037 | 20.5 | 21259 | 68 | 100 | 0.3 | Example of invention |
| 2 | 76 | _24_ | _62_ | 1009 | 17.9 | 18061 | 24 | 65 | 1.3 | Comparative example |
| 3 | 78 | _22_ | _25_ | 985 | 18.3 | 18026 | 17 | 68 | 1.3 | Comparative example |
| 4 | 74 | _26_ | _31_ | 1007 | 18.3 | 18428 | 23 | 58 | 1.3 | Comparative example |
| 5 | 80 | _20_ | _5_ | 936 | 18.3 | 17129 | 12 | 61 | 1.6 | Comparative example |
| 6 | 72 | _28_ | _45_ | 999 | 16.1 | 16084 | 20 | 66 | 1.9 | Comparative example |
| 7 | 78 | _22_ | _8_ | 1000 | 18 | 18000 | 16 | 64 | 1.6 | Comparative example |
| 8 | 64 | 36 | _4_ | 1092 | 17.1 | 18673 | 14 | 60 | 1.6 | Comparative example |
| 9 | 51 | 49 | 89 | 1074 | 18.8 | 20191 | 54 | 114 | 0.4 | Example of invention |
| 10 | 72 | _28_ | _60_ | 1040 | 17.4 | 18096 | 21 | 62 | 1.3 | Comparative example |
| 11 | 74 | _26_ | _54_ | 1025 | 17.6 | 18040 | 26 | 69 | 1.3 | Comparative example |

TABLE 3-continued

| Galvanized steel sheet No. | Microstructure* | | | Mechanical test values | | | | | | |
|---|---|---|---|---|---|---|---|---|---|---|
| | Area fraction (%) of α-phase relative to entirety of microstructure | Area fraction (%) of M-phase relative to entirety of microstructure | Area fraction (%) of tempered M-phase relative to entirety of M-phase | TS (MPa) | El (%) | TS × El (MPa · %) | λ (blanking process) (%) | λ (reaming process) (%) | R/t | Remarks |
| 12 | 59 | 41 | 34 | 1008 | 14.7 | 14818 | 13 | 65 | 1.7 | Comparative example |
| 13 | 79 | 21 | 22 | 981 | 18.8 | 18443 | 14 | 63 | 1.3 | Comparative example |
| 14 | 0 | 56 | 92 | 1076 | 14.3 | 15387 | 63 | 99 | 0.4 | Comparative example |
| 15 | 80 | 20 | 35 | 1008 | 17.9 | 18043 | 22 | 62 | 1.7 | Comparative example |
| 16 | 63 | 25 | 55 | 1051 | 17.3 | 18182 | 34 | 68 | 1.3 | Comparative example |
| 17 | 58 | 42 | 94 | 1101 | 17.3 | 19047 | 52 | 109 | 0.3 | Example of invention |
| 18 | 63 | 37 | 90 | 1067 | 18.5 | 19740 | 55 | 118 | 0.2 | Example of invention |
| 19 | 52 | 48 | 88 | 1240 | 15.8 | 19592 | 68 | 101 | 0.4 | Example of invention |
| 20 | 33 | 67 | 90 | 1311 | 11.6 | 15208 | 50 | 55 | 1.3 | Comparative example |
| 21 | 72 | 28 | 22 | 1069 | 21.2 | 22663 | 14 | 42 | 1.6 | Comparative example |
| 22 | 42 | 58 | 38 | 1153 | 12.1 | 13951 | 54 | 99 | 0.6 | Comparative example |
| 23 | 38 | 62 | 95 | 1078 | 14.5 | 15631 | 50 | 61 | 1.3 | Comparative example |

*α: ferrite, M: martensite
A_H: ¥NRPORTBL¥RP¥SSEILER074¥1354373_1.DOC

The invention claimed is:

1. A high-strength galvanized steel sheet having excellent formability, the steel sheet having a component composition containing, on the basis of mass percent, 0.05 to 0.2% C, 1.05 to 2.5% Si, 1.5 to 3.0% Mn, 0.001 to 0.05% P, 0.0001 to 0.01% S, 0.001 to 0.1% Al, and 0.0005 to 0.01% N, the balance being Fe and incidental impurities; and the steel sheet having a microstructure including a ferritic phase and a martensitic phase including a tempered-martensitic phase, the ferritic phase having an area fraction of 30% or more relative to an entirety of the microstructure, the martensitic phase having an area fraction of 30 to 50% relative to the entirety of the microstructure, and the tempered-martensitic phase having an area fraction of 70% or more and 94% or less relative to an entirety of the martensitic phase.

2. The high-strength galvanized steel sheet having excellent formability according to claim 1, further containing, on the basis of mass percent, at least one of 0.01 to 1.5% Cr, 0.0005 to 0.1% Ti, 0.0003 to 0.003% B, 0.0005 to 0.05% Nb, 0.01 to 1.0% Mo, 0.01 to 2.0% Ni, and 0.01 to 2.0% Cu.

3. The high-strength galvanized steel sheet having excellent formability according to claim 1, wherein the steel sheet has a galvannealing coating.

4. The high-strength galvanized steel sheet having excellent formability according to claim 1, wherein the amount of Al is not higher than 0.036%.

5. The high-strength galvanized steel sheet having excellent formability according to claim 2, wherein the steel sheet has a galvannealing coating.

* * * * *